United States Patent
Baltatu et al.

(10) Patent No.: US 8,275,175 B2
(45) Date of Patent: Sep. 25, 2012

(54) AUTOMATIC BIOMETRIC IDENTIFICATION BASED ON FACE RECOGNITION AND SUPPORT VECTOR MACHINES

(75) Inventors: Madalina Baltatu, Turin (IT); Rosalia D'Alessandro, Turin (IT); Roberta D'Amico, Turin (IT); Massimo Tistarelli, Alghero (IT); Enrico Grosso, Sassari (IT); Manuele Bicego, Sassari (IT)

(73) Assignee: Telecom Italia S.p.A., Milan (IT)

( * ) Notice: Subject to any disclaimer, the term of this patent is extended or adjusted under 35 U.S.C. 154(b) by 987 days.

(21) Appl. No.: 11/989,639

(22) PCT Filed: Jul. 29, 2005

(86) PCT No.: PCT/EP2005/008254
§ 371 (c)(1),
(2), (4) Date: Nov. 12, 2008

(87) PCT Pub. No.: WO2007/016936
PCT Pub. Date: Feb. 15, 2007

(65) Prior Publication Data
US 2009/0074259 A1    Mar. 19, 2009

(51) Int. Cl.
*G06K 9/00* (2006.01)
(52) U.S. Cl. ............................................. 382/118
(58) Field of Classification Search .................. 382/118
See application file for complete search history.

(56) References Cited

U.S. PATENT DOCUMENTS

| | | | |
|---|---|---|---|
| 5,561,718 A * | 10/1996 | Trew et al. ..................... | 382/118 |
| 6,694,054 B1 | 2/2004 | Gardes et al. | |
| 2003/0103652 A1 | 6/2003 | Lee et al. | |
| 2004/0013303 A1 | 1/2004 | Lienhart et al. | |
| 2006/0210141 A1 * | 9/2006 | Kojitani et al. ............... | 382/141 |

OTHER PUBLICATIONS

Hongliang Jin; Qingshan Liu; Hanqing Lu; , "Face detection using one-class-based support vectors," Automatic Face and Gesture Recognition, 2004. Proceedings. Sixth IEEE International Conference on , vol., no., pp. 457-462, May 17-19, 2004 doi: 10.1109/AFGR.2004.1301575.*

Face Authentication Using One-Class Support Vector Machines Manuele Bicego, Enrico Grosso and Massimo Tistarelli Advances in Biometric Person Authentication Lecture Notes in Computer Science, 2005, vol. 3781/2005, 15-22, DOI: 10.1007/11569947_3.*

Yuan, et al., "A Novel Support Vector Classifier with Better Rejection Performance", IEEE Computer Society Conference on Computer Vision and Pattern Recognition (CVPR'03), pp. 419-424, (2003).

Mele, et al., "Object Recognition Using Hierarchical SVMs", XP-002353939, pp. 109-114, (2003).

Seo, et al., "Face Detection Using Support Vector Domain Description in Color Images", IEEE, ICASSP, pp. V-729-V-732, (2004).

(Continued)

*Primary Examiner* — Hadi Akhavannik
(74) *Attorney, Agent, or Firm* — Finnegan, Henderson, Farabow, Garrett & Dunner, L.L.P.

(57) ABSTRACT

An automatic biometric identification method based on face recognition and support vector machines, includes enrolling a user to generate a user's reference template; and identifying the user based on the user's reference template, wherein generating a user's reference template includes acquiring a number of user's face images, and training a one-class support vector machine based on the user's face images only.

24 Claims, 5 Drawing Sheets

OTHER PUBLICATIONS

Feng, "Facial Expression Recognition Based on Local Binary Patterns and Coarse-to-Fine Classification", Proceedings of the Fourth International Conference on Computer and Information Technology, IEEE, pp. 178-183, (2004).

Cristianini, et al., "An Introduction to Support Vector Machines and other kernel-based learning methods", Cambridge University Press, pp. 93-122, (2000).

Heisele, et al., "Face recognition: component-based versus global approaches", Computer Vision and Image Understanding, vol. 91, pp. 6-21, (2003).

Zhuang, et al., "Training Support Vector Machines for Video Based Face Recognition", Tsinghua University, Beijing, pp. 1-1 to 7, (2001).

Jonsson, et al., "Support Vector Machines for Face Authentication", The $10^{th}$ British Machine Vision Conference, pp. 543-553, (1999).

Bileschi, et al., "Advances in component-based face detection", First International Workshop, SVM, Proceedings, (Lecture Notes in Computer Science, vol. 2388, pp. 1-53, (Jan. 2003).

Guodong, et al., "Face Recognition by Support Vector Machines", Proc. IEEE International Conference on Automatic Face and Gesture Recognition, pp. 1-6, (2000).

Heisele, et al., "Face Detection in Still Gray Images", A.I. Memo 1687, Center for Biological and Computational Learning, MIT, Cambridge, pp. 1-2, 1-25, (May 2000).

Tax, "One-class classification", P.h.D. thesis, Technical University of Delft, pp. i-xii, 1-190, (2001).

Viola, et al., "Rapid Object Detection using a Boosted Cascade of Simple Features", Proceeding of CVPR, vol. 1, pp. 1-9, (2001).

Papageorgiou, et al., "A General Framework for Object Detection", Proceedings of the International Conference on Computer Vision, pp. 555-562, (1998).

Schapire, et al., "Theoretical Views of Boosting and Applications", Proceedings of the $10^{th}$ International Conference on Algorithmic Learning Theory, pp. 13-25, (1999).

Lienhart, et al., "An Extended Set of Haar-like Features for Rapid Object Detection", IEEE Proceedings of ICIP, vol. 1, pp. 900-903, (2002).

Yuille, et al., "Image Warping for Shape Recovery and Recognition", Computer Vision and Image Understanding, vol. 72, No. 3, pp. 1-22, (1998).

Saradha, et al., "A Hybrid Feature Extraction Approach for Face Recognition Systems", ICGST International Conference on Graphics, Vision and Image Processing, pp. 1-8, (2004).

Ojala, et al., "Multiresolution Gray-Scale and Rotation Invariant Texture Classification with Local Binary Patterns", IEEE Transactions on Pattern Analysis and Machine Intelligence, vol. 24, No. 7, pp. 971-987, (Jul. 2002).

Ahonen, et al., "Face Recognition with Local Binary Patterns", ECCV, LNCS 3021, pp. 469-481, (2004).

Burges, "A tutorial on Support Vector Machines for pattern recognition", Data Mining and Knowledge Discovery, 2, pp. 121-167, (1998).

* cited by examiner

AUTOMATIC BIOMETRIC IDENTIFICATION BASED ON FACE RECOGNITION AND SUPPORT VECTOR MACHINES

CROSS-REFERENCE TO RELATED APPLICATIONS

This application is a National Stage application of PCT Application No. PCT/EP2005/008254, filed Jul. 29, 2005, which claims priority to German Application No. DE 10-2005-038-733.0, filed Aug. 16, 2005.

TECHNICAL FIELD OF THE INVENTION

The present invention relates in general to automatic biometric identification based on face recognition and support vector machines.

BACKGROUND ART

Biometric identification may be performed via an automated system capable of capturing a biometric sample or evidence from a user, extracting biometric data from the sample, comparing the biometric data with that contained in one or more reference templates, deciding how well they match, and indicating whether or not an authentication of identity or identification has been achieved.

Biometric identification based on face recognition is particularly useful for security applications and human-machine interfaces, and support vector machines (SVMs) are a class of learning algorithms for classification/regression that are particularly useful for high dimensional input data with either large or small training sets. Support vector machines suitable for identification problems work by mapping the input features to the SVM into a high-dimensional feature space, and computing linear functions on those mapped features in the high-dimensional feature space.

SVMs are generally trained through supervised learning, in which the best function that relates the output data to the input data is computed, and the goodness of this function is judged by its ability to generalize on new inputs, i.e., inputs which are not present in the training set. For a detailed description of learning methods for SVMs, reference may be made to N. Cristianini, J. Shawe-Taylor, *An Introduction to Support Vector Machines and other kernel-based learning methods*, pp. 93-122, Cambridge University Press, 2000.

Currently, several methods are known that propose the use of SVMs, alone or in combination with other recognition techniques, for face recognition and/or detection.

For example, B. Heisele, P. Ho, J. Wu, T. Poggio, *Face Recognition: component-based versus global approaches*, in Computer Vision and Image Understanding 1991, pp. 6-21, Elsevier, 2003 proposes three SVM-based face recognition methods, wherein the first one follows a so-called component-based approach, according to which the facial components are located, extracted, and combined in a single feature vector that is classified by a SVM. Briefly, the SVM-based recognition system decomposes the face into a set of components that are interconnected by a flexible geometrical model. The other two SVM-based face recognition methods are implementations of global systems, which recognize faces by classifying single feature vectors consisting of the gray values of the whole face image. In particular, in the first global system an SVM is created for each person in the database, whereas the second global system uses sets of view-specific SVMs that are clustered during training.

Another SVM-based face recognition system is proposed in L. Zhuang, H. Ai, G. Xu, *Training Support Vector Machines for video based face recognition*, Tsinghua University, Beijing, 2001, where two different strategies for m-class video-based face recognition problem with SVMs are discussed for global face feature sets and for Principal Component Analysis (PCA) compressed feature sets. In the case of global feature sets, normalized raw samples are considered as feature vectors of 2112 gray values for SVM training, while in the second case, the coefficients of PCA projection are used as feature vectors for training.

A further analysis of the use of SVMs in the context of face recognition is disclosed in K. Jonsson, J. Kittler, Y. P. Li, J. Matas, *Support Vector Machines for Face Authentication*, The 10th British Machine Vision Conference 1999, pp. 543-553. This paper supports the hypothesis that the SVM approach is able to extract the relevant discriminatory information from the training data, even when no complex transformations are performed on the original raw face images. Analyzing the results of the experiments in which faces were represented in both Principal Component and Linear Discriminant spaces, the authors come to the conclusion that SVMs have an inherent potential to capture the discriminatory features from the training data irrespective of representation and preprocessing.

Yet, US 2003/0103652 discloses a system and a method for performing face registration and authentication using face information. A set of readily distinguishable features for each user is selected at a registration step, and only the set of features selected at the registration step is used at a face authentication step, whereby memory use according to unnecessary information and amount of data calculation for face authentication can be reduced. Therefore, identity authentication through face authentication can be performed even under restricted environments of a USB token or smart card with limited resources, and authentication performance is improved, as readily distinguishable feature information is used, and the time for face authentication is reduced, as face authentication is performed using the SVM built by using the optimal set of readily distinguishable features at a training step.

Additionally, in S. M. Bileschi, B. Heisele *Advances in component-based face detection, Pattern Recognition with Support Vector Machines*, First International Workshop, SVM 2002, Proceedings (Lecture Notes in Computer Science Vol. 2388), pp. 135-43, a component-based face detection system trained only on positive examples is described. On the first layer, SVM classifiers detect predetermined rectangular portions of faces in gray scale images. On the second level, histogram-based classifiers judge the pattern using only the positions of maximization of the first level classifiers. In this approach, selected parts of the positive pattern are used as negative training for component classifiers, and the use of pair-wise correlation between facial component positions to bias classifier outputs and achieve increased component localization.

The Applicant has noted that in the field of biometric authentication based on facial recognition with m-class SVMs (that perform classification of data into more than two classes) a problem exits, namely, for each authorized user a huge number of user's face samples are required for the training of the SVMs so as to achieve a good level of recognition, i.e. a low error rate. This can lead to an enrollment process (i.e., a process of collecting biometric samples from a user and subsequently computing and storing a biometric reference template representing the user's identity) for each authorized user, taking a large amount of time and computational resources.

Generally, two approaches can be used for training m-class SVMs, the one-versus-all approach, and, respectively, the pair-wise approach.

Specifically, in the one-versus-all approach, SVMs are trained, each SVM separating a single class from all the remaining classes. As such, an SVM exists for each user in the authorized clients' database that recognizes/discriminates the user from any other user in the database.

In the pair-wise approach, m(m−1)/2 SVMs are trained, each separating a pair of classes. The SVMs are disposed in trees, where each tree node represents an SVM. In G. Guodong, S. Li, C. Kapluk, *Face recognition by support vector machines*, in Proc. IEEE International Conference on Automatic Face and Gesture Recognition, 2000, pp. 196, a bottom-up tree similar to the elimination tree used in tennis tournaments was applied to face recognition.

Both solutions are supervised learning procedures that need both positive and negative training examples, i.e., samples of the face of the user to be recognized, and, respectively, samples of faces of people different than the user to be recognized, and the limit of these solutions is that for a reliable recognition (i.e., a low error rate), an enormous number of negative examples are required. In the best case in terms of computational speed, in the one-versus-all approach, the number of negative examples has to be at least equal to the number of entries in the database minus one, all multiplied by a constant (for example, the number of possible head poses). Likewise, the second approach may become computationally very slow if the users' database increases. Of course, the algorithms performance depends on the available computational power, but generally these approaches may not scale well, with an enrollment process that may take several days (reference may, for example, be made to B. Heisele, T. Poggio, M. Pontil, *Face Detection in still gray images*, A. I. Memo 1687, Center for Biological and Computational Learning, MIT, Cambridge, 2000).

OBJECT AND SUMMARY OF THE INVENTION

The object of the present invention is therefore to provide an automatic biometric identification method and system based on face recognition and support vector machines, which mitigate the afore-mentioned problems.

This object is achieved by the present invention in that it relates to an automatic biometric identification method and system based on face recognition and support vector machines, and to a computer program product.

In a first aspect of the invention, the object is achieved by an automatic biometric identification method based on face recognition and support vector machines, including:
generating a user's reference template; and
identifying the user based on the user's reference template;
wherein generating a user's reference template includes:
acquiring a number of user's face images; and
training a support vector machine based on the user's face images;
characterized in that the support vector machine is a one-class support vector machine trained based on user's face images only.

In a second aspect of the present invention, the object is achieved by an automatic biometric identification system based on face recognition and support vector machines, including:

a module for generating a user's reference template, the module comprising a support vector machine; and
a module for identifying the user based on the user's reference template;
wherein said module for generating a user's reference template includes:
a module for acquiring a number of user's face images; and
a module for training the support vector machine based on the user's face images;
characterized in that the support vector machine is a one-class support vector machine trained based on user's face images only.

In a third aspect of the present invention, the object is achieved by a computer program product able, when loaded and run in a processing system, to implement the method of the present invention.

In broad outline, the Applicant has found that the aforementioned problems can be solved by exploiting a one-class SVM (OC-SVM) for recognizing the face of an authorized user. One of the main advantages of the use of an OC-SVM lies in the fact that, for the training of the OC-SVM, only positive examples of the user are to be used, while the recognition of the authorized user is based only on the trained OC-SVM. In this way, a very fast and significantly less resource consuming face recognition procedure can be performed, maintaining a high level of recognition.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited to the embodiments shown, but is to be accorded the widest scope consistent with the principles and features disclosed herein and defined in the attached claims.

In order to facilitate understanding of the present invention, introduced hereinafter is some mathematical notation relating to SVMs.

SVMs were firstly developed by V. Vapnik in *The Nature of Statistical Learning Theory*, Springer-Verlag, New York, 1998, based on a principle known as Structural Risk Minimization from statistical learning theory. They can be applied to regression, classification, and density estimation problems.

Briefly, SVMs belong to the category of maximum-margin classifiers, and they naturally perform binary classification (i.e., they have two output classes), by finding, in the feature space of the SVM, a decision hypersurface (usually a hyperplane) that splits the positive examples from the negative examples, the split being such as to have the largest distances from the hypersurface to the nearest of the positive and negative examples, generally making the classification correct for testing data that is near, but not identical to the training data.

Focusing on classification, SVMs receives as input an independent and identically distributed (i.i.d.) training sample $S=(x_1, y_1), (x_2, y_2), \ldots, (x_n, y_n)$, of size n from a fixed but unknown distribution $Pr(x, y)$ describing the learning task, wherein $x_i$ are vectors representing the input data to be classified (the observations), while $y_i$, typically in the set $\{-1, +1\}$ are the class labels.

In their basic form, SVMs learn binary, linear decision rules in the form:

$$h(x) = \begin{cases} \text{sign}(w \cdot x + b) & \text{if } w \cdot x + b \geq 0 \\ -1 & \text{otherwise} \end{cases}$$

Figure 1:
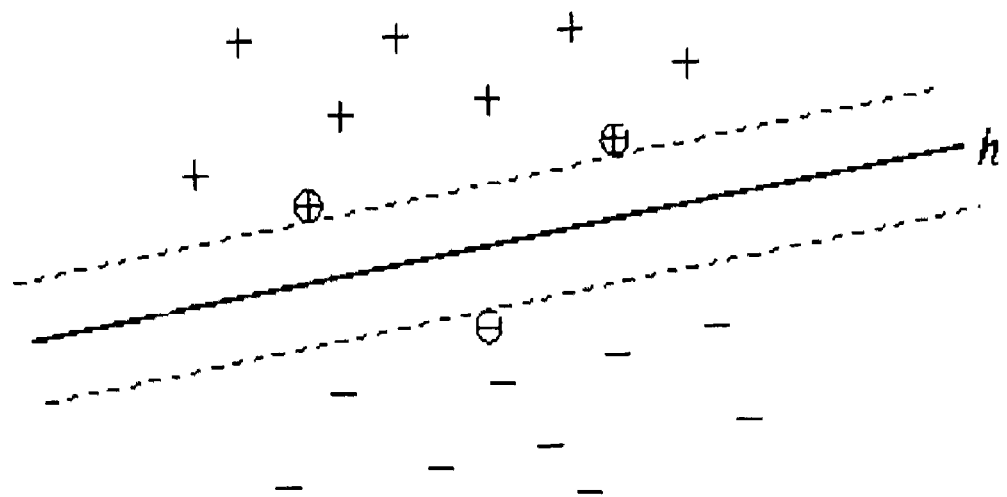
FIG. 1 shows a hyperplane, separating positive and negative training examples, and support vectors in a high-dimensional feature space of an SVM.

The decision function, also known as hypothesis, is described by a weight vector w and a threshold b. According to which side of the hypersurface the input vector x lies on, it is classified into class +1 or −1. The idea of structural risk minimization is to find a hypothesis h for which the lowest error probability can be guaranteed. With SVMs, Vapnik showed that this goal can be translated into finding the hypersurface with largest margin for separable data. In other words, for separable training sets, SVMs find the hypersurface h, which separates the positive and negative training examples, marked with "+" and "−", respectively, in FIG. 1, with largest margin. The examples closest to the hypersurface h are called support vectors, marked with circles in FIG. 1.

Computing the hypersurface is equivalent to solving the following quadratic optimization problem in the Lagrangian representation (for more details reference may be made to N. Cristianini, J. Shawe-Taylor, *An Introduction to Support Vector Machines and other kernel-based learning methods*, pp. 93-122, Cambridge University Press, 2000:

$$\text{minimize } W(\alpha) = -\sum_{i=1}^{n} \alpha_i + \frac{1}{2} \sum_{i=1}^{n} \sum_{j=1}^{n} y_i y_j \alpha_i \alpha_j x_i x_j$$

subject to $\Sigma \alpha_i y_i = 0, \forall \alpha_i, 0 \leq \alpha_i \leq C, i = 1, \ldots, n$.

Support vectors are those training vectors $x_i$ corresponding to positive Lagrangian coefficients $\alpha_i > 0$. From the solution of this optimization problem the decision rule can be computed as:

$$w \cdot x = \Sigma \alpha_i y_i x_i x \text{ and } b = y_{tsv} - w \cdot x_{tsv}$$

The training example $(x_{tsv}, y_{tsv})$ for calculating b must be a support vector with $\alpha_{tsv} < C$.

For both solving the quadratic optimization problem as well as applying the learned decision rule, it is sufficient to be able to calculate inner products between observation vectors. Exploiting this property, the use of kernel functions, denoted by $K(x_1, x_2)$, was introduced for learning non-linear decision rules. Such kernel functions calculate an inner product in some high-dimensional feature space and replace the inner product in the formulas above.

Popular kernel functions are linear, polynomial, radial basis function (RBF), and sigmoid:

$$K_{lin}(x_i, x_j) = x_i \cdot x_j$$

$$K_{poly}(x_i, x_j) = (x_i \cdot x_j + 1)^p$$

$$K_{rbf}(x_i, x_j) = \exp(-(x_i - x_j)^2 / s^2)$$

$$K_{sig}(x_i, x_j) = \tan h(s(x_i \cdot x_j) + c)$$

Therefore, depending on the type of the kernel function, SVMs can be linear classifiers, polynomial classifiers, radial basis function (RBF) classifiers, or two-layer sigmoid neural networks.

In OC-SVMs the support vectors characterizing the user's class are obtained only from positive training examples. In particular, such support vectors define a hypersphere that encloses all possible representations of the user. All observations (input vectors) lying outside this hypersphere are considered impostors' representations.

The problem the OC-SVM has to solve is the estimation of a model function h(x, w) which gives a closed boundary around the target class data (reference may for example be made to D. M. J. Tax, *One-class classification*, Concept learning in the absence of counter examples, Ph.D. thesis, Technical University of Delft, 2001). This closed boundary is a hypersphere that contains all the training objects $X^{tr}$, and that is characterized by a center a and a radius R, as illustrated in FIG. 2.

Figure 2:
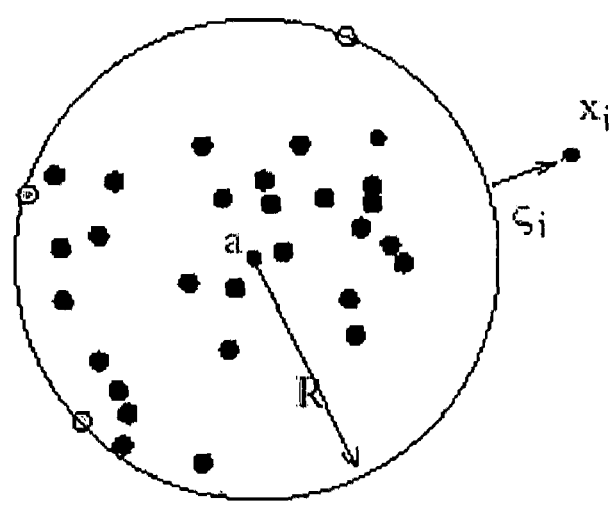
FIG. 2 shows a hypersphere containing training vectors, and support vectors in the high-dimensional feature space of an one-class SVM.

In particular, in FIG. 2 three objects are on the boundary of the hypersphere, and these three objects are the support vectors, while an object $x_i$ is outside the hypersphere since it has $\xi_i > 0$, where $\xi_i$ is a measure of the classification error (i.e., the difference between the distance from object $x_i$ to the center a and the radius of the hypersphere R).

Basically, the OC-SVM minimizes the structural error defined as:

$$E(R, a) = R^2$$

subject to the following constraint:

$$\|x_i - a\|^2 \leq R^2, \forall i$$

To allow the possibility of outliers in the training set, and therefore to make the method more robust, the distance from objects $x_i$ to the center a is not strictly smaller than $R^2$, but larger distances are penalized. This means that the empirical error is not zero, so slack variables $\xi$, $\xi_i > 0$, $\forall i$ are introduced and the minimization problem becomes:

$$E(R, a, \xi) = R^2 + C \cdot \Sigma_i \xi_i$$

with the constraint that almost all objects are within the following hypersphere:

$$\|x_i - a\|^2 \leq R^2 + \xi_i, \forall i$$

Parameter C gives the tradeoff between the volume of the description and the errors. By introducing Lagrange multipliers and constructing the Lagrangian, the minimization of this error is a well-known quadratic programming problem, for which standard algorithms exist (reference may again be made to the above-referenced One-class classification).

By solving this problem the support vectors are obtained (which practically represent the user reference template) together with the following expression for the center a of the hypersphere:

$$a = \sum_i \alpha_i x_i$$

As such, new objects are accepted by the description if the distance from the objects to the center a of the hypersphere is lower than or equal to the radius R.

Difficulties with one-class classification are related to the training set construction, the SVM input data representation, and the SVM parameters tuning.

These aspects are strictly related together and are important for a good classification, and the Applicant proposes a particular training set construction method, several working optimized representations of the input vectors, and a method for automatically configuring the SVM parameters.

Specifically, the present invention relates to a biometric authentication system based on face recognition and comprising two sub-systems: an enrollment or training sub-system responsible for OC-SVM training, and a verification or authentication sub-system responsible for identity verification. Each sub-system comprises several modules, some of which are in common between the two sub-systems and are used during both enrollment and verification.

Figure 3:
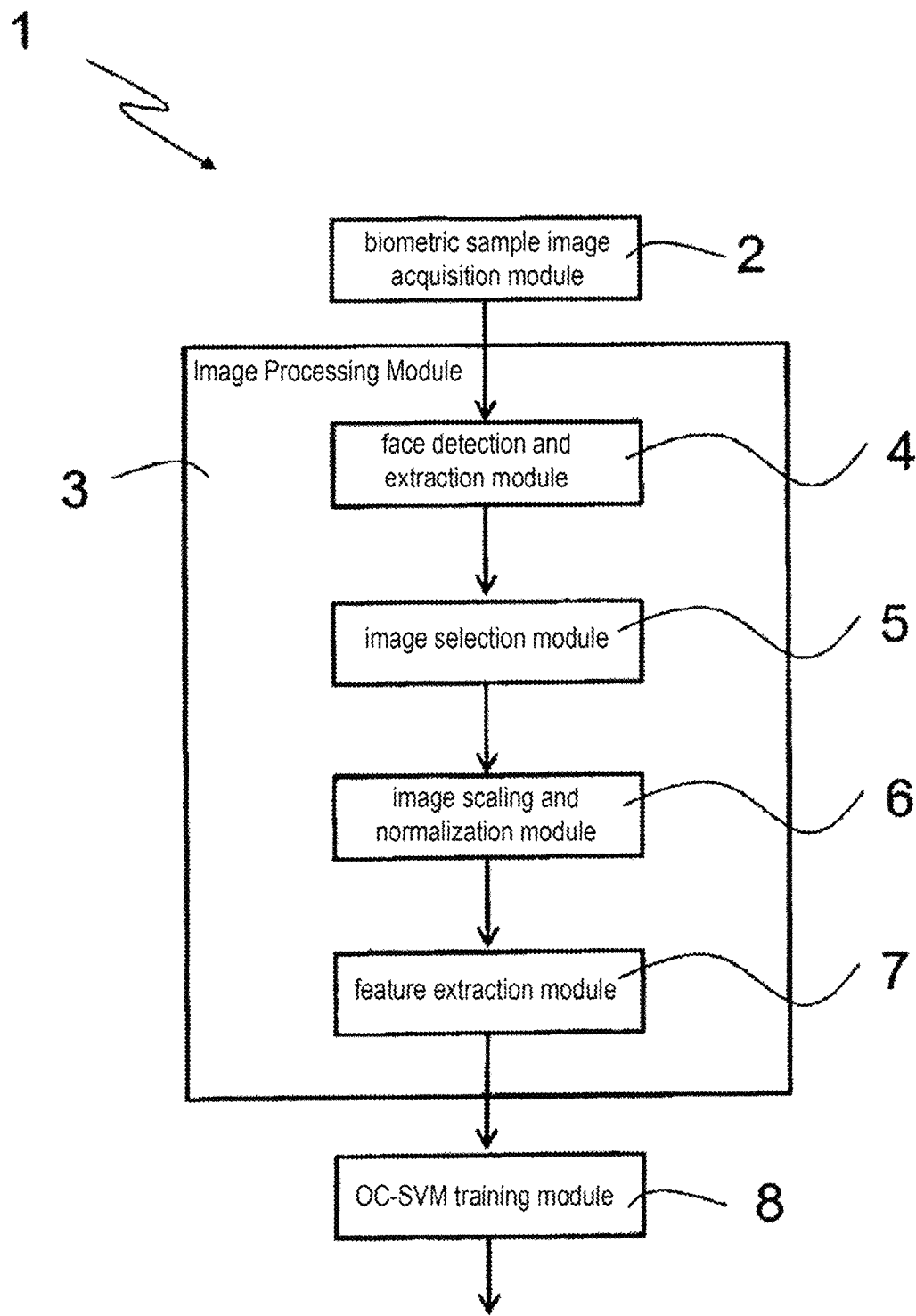
FIG. 3 shows a block diagram of an enrollment system according to the present invention.

FIG. 3 shows a block diagram of the enrollment sub-system.

The enrollment sub-system, designated as a whole by 1, comprises:
  a biometric sample image acquisition module 2 responsible for the acquisition of biometric sample images (i.e., face images);
  an image processing module 3 comprising:
    a face detection and extraction module 4,
    an image selection module 5,
    an image scaling and normalization module 6,
    a feature extraction module 7 responsible for the construction of the training set; and
  an OC-SVM training module 8 responsible for the creation of the authenticator, i.e., the final support vectors that will be used for user's identification. The obtained support vectors together with some OC-SVM specific parameters represent the user's biometric reference template.

In particular, the biometric sample image acquisition module 2 supports multiple inputs, like: a live captured video, a saved video or multiple images of the user's biometric sample (either live or saved images). The live video or images of the user's face can be captured by any video camera, like a common webcam, a digital PDA, a cellular camera, etc. Any software that controls the interface with the video camera and the video acquisition can be used, e.g., the Intel Open Source Image Processing and Computer Vision library OpenCV, OpenCV Reference Manual, (downloadable at http://www.sourceforge.net/projects/opencvlibrary at the filing date of the present patent application).

The face detection and extraction module 4 performs face detection on each acquired video frame. This phase is also necessary for rejecting inappropriate frames, i.e. frames that do not contain a face.

The algorithm used for face detection implements the machine learning approach for visual object detection described in P. Viola, M. Jones, *Rapid Object Detection using a Boosted Cascade of Simple Features*, In Proceeding of CVPR 2001, vol. 1, pp. 511-518, based on the application of Haar filters and the AdaBoost algorithm described in C. Papargeorgiou, M. Oren, T. Poggio, *A general framework for object detection*, in Proceedings of the International Conference on Computer Vision, pp. 555-562, 1998.

The face detection algorithm is structured in three fundamental image processing steps:
  obtaining a particular image representation called "integral image" which permits a rapid computation of the features subsequently used for detection. These features are a reminiscent of Haar basis functions, or Haar filters, also described in the above-referenced *A general framework for object detection;*
  implementing an automated machine learning algorithm, based on the AdaBoost algorithm described in R. Schapire, *Theoretical views of boosting and applications*, in Proceedings of the 10th International Conference on Algorithmic Learning Theory, 1999, pp. 13-25, which selects a small number of critical visual features from a large set of features and produces efficient classifiers; and
  applying a combination of more complex classifiers in a cascade structure, which increases the speed of the detector by focusing on interesting regions of the image, on which more complex processing is performed.

The output of the face detection and extraction module 4 is the image or image frames of variable size containing the user's face with little background. The method is further optimized by means of two procedures described in R. Lienhart, J. Maydt, *An extended set of Haar-like features for rapid object detection*, in IEEE Proceedings of ICIP 2002, vol. 1, pp. 900-903, which proposes the use of an extended Haar features set (rotated features are added).

Selection of critical visual features performed in the second step of the face detection algorithm includes eye and mouth detection on the selected face images. In order to perform this task different techniques can be applied. For example, a template matching technique can be used, based on masks (one for each element to detect) sliding on the overall face image. The implemented technique converts the original face image from the RGB color space to the YCrCb color space. From the YCrCb image, two maps are computed: a map for the chrominance component and another for the luminance component. These components are then combined using an AND function. Eventually, the histogram is computed on the resulting image, the two peaks of this histogram representing the estimated eyes position. Subsequently, a mouth map is computed for mouth detection. The procedure is analogous to the described one, only the sliding mask and the map are different. The resulting histogram peak represents the estimated mouth position.

The images selection module 5 performs an image selection during both enrollment and verification procedures. In particular, based on the output of the face detection and extraction module 4 (all the images that contain a face), the appropriate number of face images are uniformly extracted from the input video sequence, such as no two similar images are chosen for training. The number of images that will be effectively used for enrollment is the dimension of the OC-SVM training set and represents a configurable parameter of the system. The appropriate value for this parameter may be obtained performing a rigorous test and tuning phase of the proposed face recognition software. During authentication, all images or image frames that contain a face are selected for identity verification.

The image scaling and normalization module 6 performs a number of operations in order to allow the proposed face recognition method to work with features extracted from black and white images. In particular, the image scaling normalization module 6 performs the following operations:

image conversion from RGB color space to intensity values (also known as gray levels);

image down scaling to a fixed size, using bilinear interpolation. The size of the resulting image differs depending on the features extraction algorithm used; e.g. if the original face images size is 320×240, the resulting image size can be 128×128 pixels.

two-dimensional warping of intensity images to mitigate small three-dimensional geometric changes of the faces, due to different poses of the subject's head from one acquisition to another. The base points (also known as features) of the source image are extracted, features correspondence with a generic face model is computed, and the warping is performed to produce a target frontal image of the subject's face. Feature correspondence is used to obtain the mapping functions that define the spatial relationships between all points in both images. These mapping functions are known as warp functions and are used to interpolate the positions of the features. The warping algorithm uses points and line segments to determine feature positions in the images (basically eyes position and mouth position) (reference may be made to A. Yuille, M. Ferraro, T. Zhang, *Image Warping for Shape Recovery and Recognition, in Computer vision and Image Understanding*, vol. 72, no. 3, pp. 351-359, 1998; and intensity transformation, namely histogram equalization, meant to produce an image enhancement. Histogram equalization is commonly performed by appearance-based face recognition algorithms, and its goal is to have a flat histogram, or a histogram as flat as possible. The histogram equalization is performed on an ellipsoidal region of the image that delimitates the face; the major part of the background is hence discarded.

The feature extraction module 7 is responsible for the construction of the training set. The proposed face recognition method can work with different sets of features extracted from normalized images. Even if the use of four types of such feature sets will be described hereinafter, other sets can also be used, since the invention provides an automatic procedure for computing the necessary SVM parameters for each new type of features set and, for increased recognition performance, for each user. Fundamentally, the value of the parameter sigma of the RBF kernel function used by the OC-SVM is estimated during the enrollment session, taking into consideration the actual feature set used and becomes a part of the user's reference template, together with the dimensionality of the feature vectors, the radius of the hypersphere and other kernel parameters.

In the followings four possible approaches for feature extraction are illustrated.

A first approach is the Fourier-Mellin transform (FMT), which produces a translation, rotation and scale invariant Fourier-Mellin feature set. This transform is also used in image recognition for image registration, and hence compensation of possible translations, rotations and scale changes. In the present invention, for the FMT features set, the Fourier-Mellin transform is applied to the gray-level images.

Figure 4:
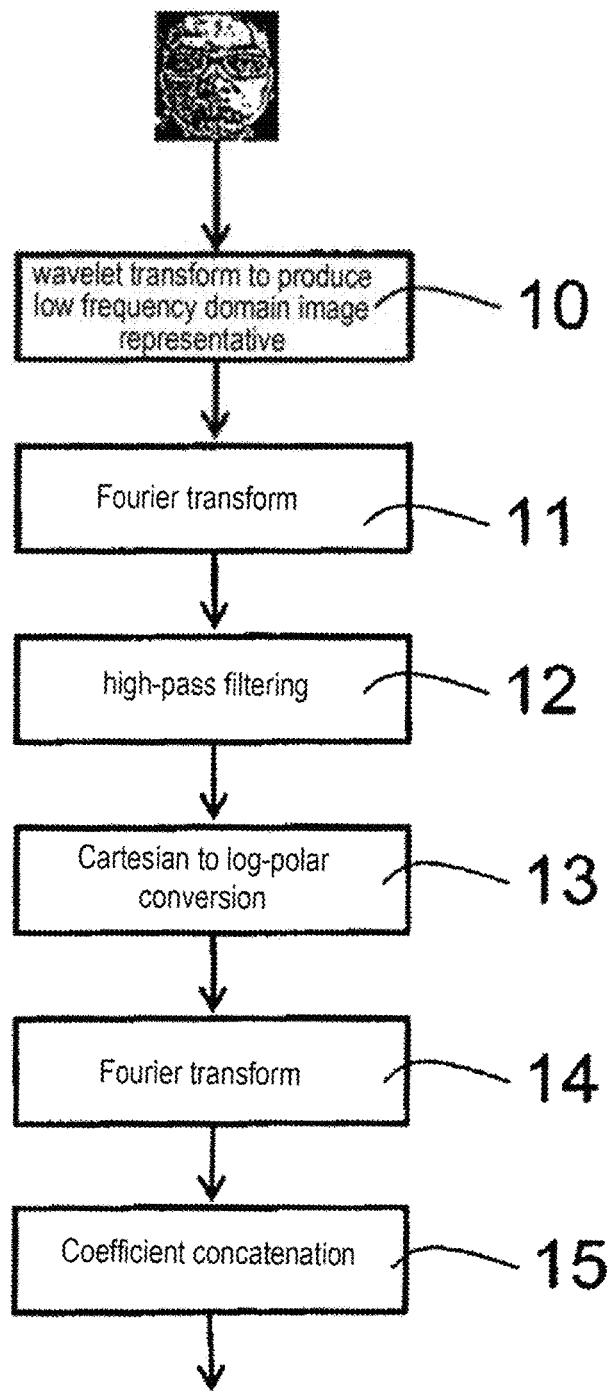
FIG. 4 shows a block diagram of a Fourier-Mellin transform that may be computed during enrollment.

FIG. 4 shows a block diagram of the Fourier-Mellin transform. Initially the wavelet transform is applied to the image in order to produce an image representation in the low frequency domain (block 10). In this way, the facial images become insensitive to different facial expressions and small occlusions (represented by the high frequency components). Then, a Fourier transform is implemented with the FFT algorithm (block 11), and a high-pass filtering is applied to the logarithm spectra to avoid some of the discontinuities around the origin due to sampling and truncation (block 12). A simple high-pass emphasis filter is used with the transfer function:

$$H(x,y)=(1-\cos \pi x \cos \pi y)*(2-\cos \pi x \cos \pi y), \frac{1}{2} \leq x, y \leq \frac{1}{2}$$

A Cartesian to log-polar conversion (block 13) and another Fourier transform (block 14) are implemented, and finally the feature vector is obtained by concatenating the coefficients of the resulting Fourier-Mellin spectrum (block 15).

Another approach for feature extraction is the bi-dimensional Fourier transform of the gray-level facial images, which produces a Fourier feature set.

Figure 5:
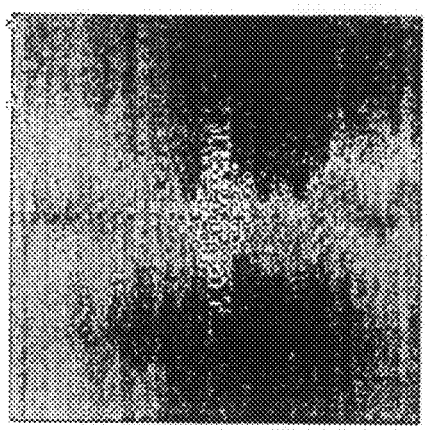
FIG. 5 shows a Fourier spectrum of a gray-level face image that may be computed during enrollment.

FIG. 5 shows the Fourier spectrum of a gray-level face image. It may be appreciated that the Fourier spectrum is concentrated around the origin (the center of the image, which represent the continuous component), in a rhombus-like region. Because of the symmetry of the Fourier spectra of real face images, it is sufficient to consider one of the quadrants of the spectrum, e.g., the upper right quadrant.

The feature vector is formed by the most significant frequencies, i.e. the low frequencies. The Applicant has experimentally determined that the lowest 27 up to 30 frequencies of the Fourier spectrum contain from 82% up to 90% of the energy of a facial image, hence the most information. The low frequencies also contain the distinguishing information (these are also the frequencies that vary the most from one user to another).

Figure 6:
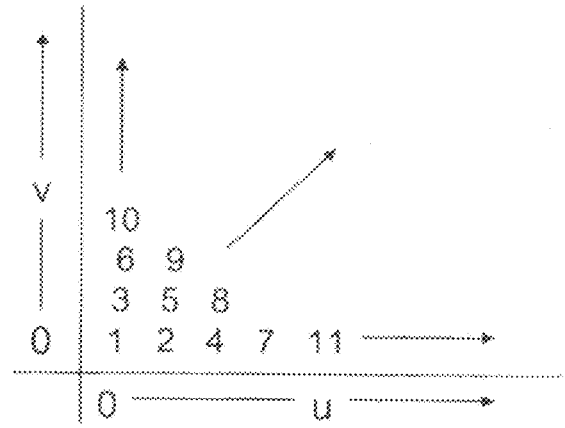
FIG. 6 shows a diagram displaying a low-frequency selection criterion that may be used during enrollment.

In a possible implementation of the present invention, the feature vector could contain the concatenation of the continuous component, the real part of the coefficients of the lowest 27 frequencies of the spectrum, and the imaginary part of the coefficients of the lowest 27 frequencies of the spectrum, thus forming a feature vector of 55 real values. FIG. 6 shows a diagram depicting the low-frequency selection criterion, where u and v are the frequency domain coordinates. Practically, up to 27 real coefficients and 27 imaginary coefficients corresponding to the lowest coordinates (u, v) are selected (where the pair (0, 1) is lower than (1, 1)).

Alternative settings are possible, but more tests conducted by the Applicant has proved that further increasing the size of the lower quadrant does not significantly increase the amount of useful information, while the discrimination capability of the classifier decreases.

Other methods can be used for features extraction (like Hu moments, Zernike moments approaches described in A. Saradha, S. Annadurai, *A Hybrid Feature Extraction Approach for Face Recognition Systems*, ICGST International Conference on Graphics, Vision and Image Processing (downloadable at http://www.icgst.com/gvip/v5/P1150515002.pdf at the filing date of the present patent application), 2004 but Fourier-based features (both Fourier-Mellin and simple Fourier) perform well with minor computational complexity.

A further approach for feature extraction is represented by the use of local binary pattern (LBP) histograms extracted from gray-level facial images.

The $LBP_{8,1}^{u2}$ operator is used (as described in T. Ojala, M. Pietikäinen, T. Mäenpää, *Multiresolution Gray-Scale and Rotation Invariant Texture Classification with Local Binary Patterns*, IEEE Transaction on Pattern Analysis and Machine Intelligence, vol. 24, no. 7, 2002, pp. 971-987), with 64 weighted windows. The binary operator uses histograms of uniform patterns computed from circular neighborhoods of 8 sampling points situated on a circle with radius 2, the window size being 16×16 pixels when working with 128×128 pixels face images. The windows are differently weighted, according to their significance for face recognition (e.g., the windows that contain the eyes are assigned the highest weights). The feature vector (the description of the face) is obtained by concatenating the histograms of the possible uniform patterns computed over the various regions of the image, like in T. Ahonen, A., Hadid, M. Pietikäinen, *Face Recognition with Local Binary Patterns*, ECCV 2004, LNCS 3021, pp. 469-481, 2004.

Figure 7:
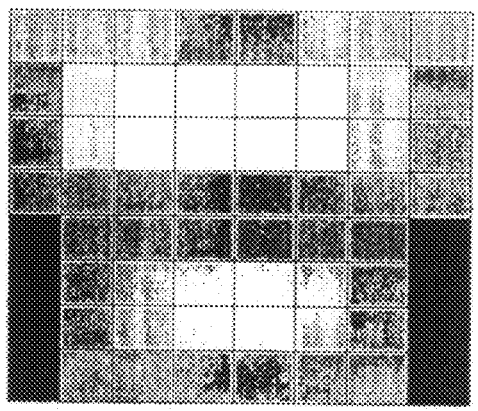
FIG. 7 shows LBP weights that may be assigned to different face regions of a face image during enrollment.

FIG. 7 shows the LBP weights assigned to different face regions of a face image. In particular, FIG. 7 depicts 64 face regions that have been assigned 5 different weights represented by different gray tonalities, wherein black stands for the smallest weight and white stands for the highest weight. It may be appreciated that the highest weights are assigned to eye and mouth regions. The described settings are not unique, different divisions into regions are possible depending on the original face image size.

This particular feature extraction algorithm requires for a slightly different OC-SVM training. In fact, each region contributes to the construction of a feature vector. Hence, if 64 face regions are defined, 64 feature vectors are obtained, and an OC-SVM is trained for each region. During authentication, each region will produce a matching percentage, which will be weighted by the weight assigned to the region, and the final score will be the weighted sum of the matching percentage obtained by each feature vector, computed with the appropriate OC-SVM.

A further approach for feature extraction is to use directly the pixel intensity values from the normalized intensity images (gray-level features). The images are scaled down to a fixed sized by applying bilinear interpolation (e.g., 40×40 pixels if the original face images size is around 128×128). The resulting images are transformed to feature vectors (by concatenating the rows of the sampled image matrices), which are subsequently used for OC-SVM training (user enrollment) or testing (user authentication).

With reference to FIG. 3, the OC-SVM training module 8 outputs the user's reference template, i.e., the support vectors that characterize the user's class. Only positive examples of user's class are used for the training of the OC-SVM. These examples are the output training sets or feature vectors produced by the previous features extraction module.

The mathematics behind the OC-SVM is fundamentally similar to the previously described one (the paradigms are the Structural Risk Minimization and representation of the problem in a high dimensional features space through the use of an appropriate kernel function). Briefly, the OC-SVM computes or learns a function h which defines a hypersphere which encloses the positive examples/observations (representing the target class), while all other observations are not necessary for the complete definition of the hypersphere.

Therefore, the OC-SVM variables that need to be set are the kernel function, the value of the constant C, the training set size, and the support vectors' size. The output of the OC-SVM consists in the value of the parameter sigma, the number of support vectors, the support vectors themselves, the weights (or coefficients, also known as Lagrangian multipliers) of each support vector, and the threshold distance to be used during the authentication phase, which threshold distance is practically the radius of the hypersphere which encloses all positive examples.

The Applicant has found that the use of an RBF kernel function is particularly advantageous for face recognition based on OC-SVM because it outperforms both sigmoid and polynomial kernel functions. The OC-SVM with an RBF kernel represents a Gaussian radial basis function classifier (reference may for example be made to C. Burges, *A tutorial on Support Vector Machines for pattern recognition*, in Data Mining and Knowledge Discovery, 2, pp. 121-167, Kluwer Academic Publishers, 1998) that automatically produces all the information necessary for template creation, i.e., the support vectors, their weights, and the threshold:

$$K_{rbf}(x_i, x_j) = \exp\left(-\frac{\|x_i - x_j\|^2}{s^2}\right)$$

where $x_i$ and $x_j$ represent the features vectors from the training features set, s is the variance of the kernel function, and $i,j \in \{1, \ldots, n\}$, where n is the size of the training set.

Additionally, the Applicant has found that the value of the variance s of the kernel function may advantageously be set equal to the average Euclidean distance between the training vectors (or training feature sets) representing the user's class, i.e.:

$$s = \underset{i,j}{\text{average}} \|x_i - x_j\|$$

Other settings are possible, but, with the Gaussian kernel, this is the configuration that gives a higher recognition performance, since it represents a good tradeoff between the false acceptance and false rejection error rates.

The value of the constant C is instead determined empirically for each type of feature vector and represents a tradeoff between the recognition and the error rates. Practically, C and s define the size and the shape of the hypersphere that encloses the user's class. With lower s, the region describing the user's class is tighter around the examples (it is called a banana-shaped region), but the false rejection rate can increase, while with a higher s ($s = \max\|x_i - x_j\|$), the region is similar to a sphere, and the false acceptance rate can increase. With a higher C (C=1.0) more examples become support vectors. Usually, adjusting s with C=1.0 is enough, but if a low false acceptance error is required, C must also be adjusted (C<1.0) according to the training set.

During testing, the Applicant has also noted that in real cases, the OC-SVM of the present invention is very strict/severe (the user class description is tighter than the spherically shaped region), and hence a need exists to adjust the radius R of the hypersphere on a per user basis to accommodate for minor changes in user's face images (pose, illumination), so as to avoid false rejections.

For this purpose, a new user training set containing new user's face images is provided, and a new value for the radius, hereinafter referred to as acceptance threshold thr, is computed according to the 5 following formula, thus practically performing a client test of the computed OC-SVM:

$$\text{thr} = (d\_\text{avg} + 3 * d\_\text{std})/R$$

where d_avg is the average value of the distances between the user's feature vectors and the boundary of the hypersphere computed for the user, d_std is the standard deviation of these distances, and R is the radius of the user's hypersphere.

Therefore, with OC-SVM, a client test is sufficient to find out the threshold value. An impostor test is also performed only as a confirmation of the correctness of the threshold setting. Hence, in a practical implementation, the acceptance threshold optimization could be performed during the enrollment session. The face image for the impostor test is fixed per gender, since for all impostors the OC-SVM exhibits approximately the same score. This tuning process is an automated process and helps to set the working point of the authentication system (i.e., the tradeoff between FAR and FRR). This procedure also helps to determine the quality of the user's reference template and the classifier's discrimination capacity using this template. A feedback is offered to the user and sometimes, if the recognition scores are unsatisfactory, the enrollment procedure is repeated.

For the LBP feature sets, the training procedure is slightly different: more OC-SVMs are trained per user, each one corresponding to a single region of the image. The actual training procedure is analogous with the procedure described previously, but more templates are produced, one template for set of equally weighted regions. These templates are stored together with the corresponding weights, and they represent the user's global reference template.

Figure 8:
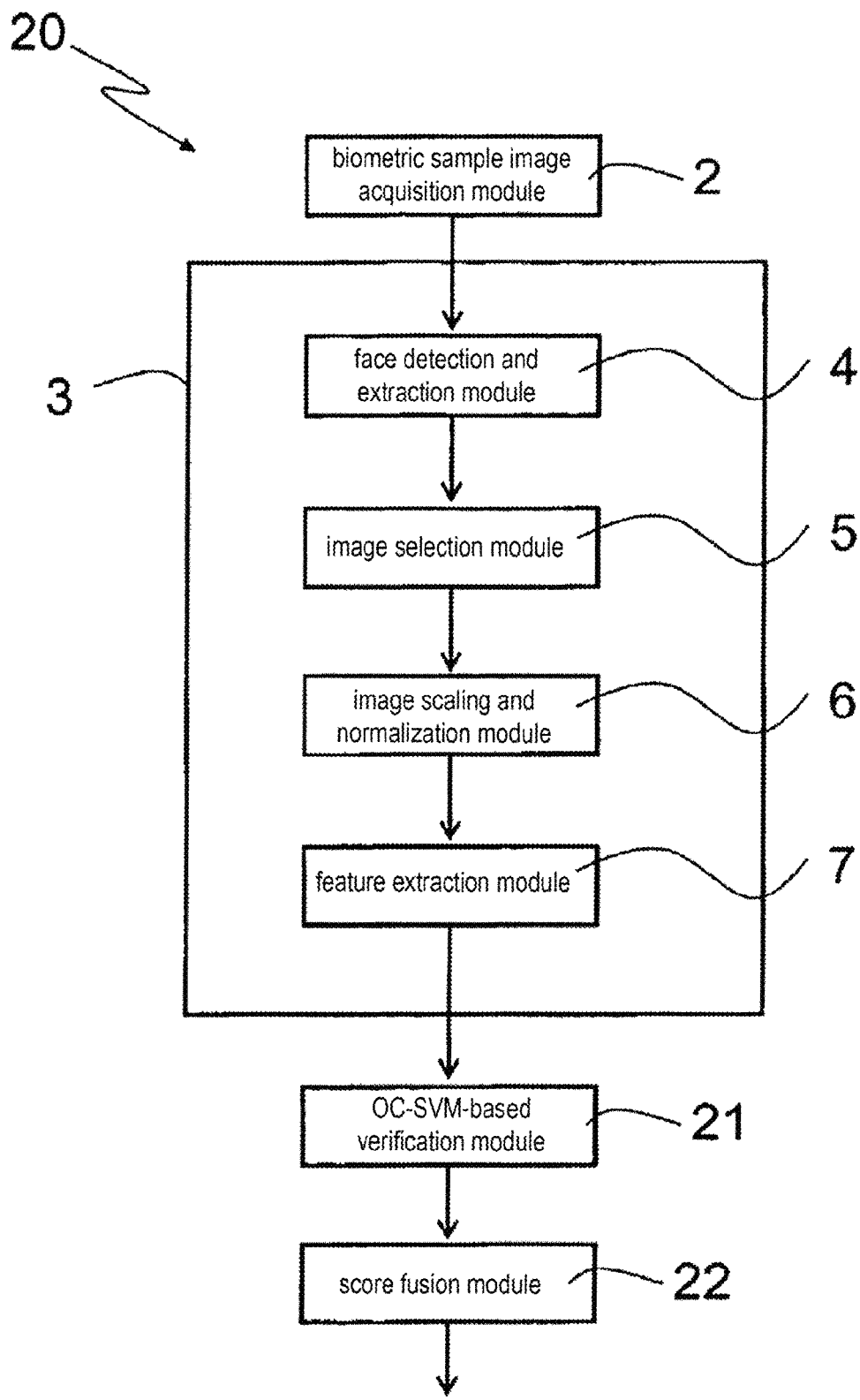
FIG. 8 shows a block diagram of a verification system according to the present invention.

Finally, FIG. 8 shows a block diagram of the verification sub-system, which includes several modules, some of which are in common with the enrollment sub-system.

In particular, the verification sub-system, designated as a whole by 20, includes:
the biometric sample image acquisition module 2 responsible for the acquisition of the biometric sample images (i.e., face images);
the image processing module 3 comprising:
the face detection and extraction module 4,
the image selection module 5,
the image scaling and normalization module 6,
the feature extraction module 7;
an OC-SVM-based verification module 21 which receives the feature vectors extracted from user images, the user's reference template, and the trained OC-SVM, and computes a score for each feature vector; and
a score fusion module 22 which receives the computed scores and outputs the authentication decision.

In particular, after the appropriate feature vector extraction phase described in detail previously, a classification procedure based on the OC-SVM trained for the user is applied to each feature vector extracted from a test image in a test set, and, in the end, the authentication decision is taken by implementing a decision fusion scheme. In the simplest case, the fusion rule is majority voting.

In more detail, the verification consists in computing the distance of each feature vector in the test set with respect to the center a of the hypersphere obtained during enrollment, dividing this distance by the radius R, and comparing this value with the user's acceptance threshold thr. A features vector is accepted as representing the user if the distance is lower than the threshold, i.e.:

$$\|x_i - \alpha\|/R \leq t, i \in \{l, m\}$$

where m is the size of the training set.

In a simple majority voting scheme, the frequency of the positive classifications is measured and the user is declared authenticated if this frequency is greater than 0.5, otherwise the user is declared an impostor. Other fusion rules can be implemented if required.

For the LBP features set, each region of the user's face obtains a distance, which is matched against the region's SVM acceptance threshold. The percentage of the correct answers is displayed by each SVM. The final authentication decisions is taken by applying a weighted sum on these percentages, where regions' weights multiply the percentages obtained by the regions (the eye region and the mouth regions are assigned major weights).

The advantages of the present invention are clear from the foregoing. In particular, not only the enrollment, but also the verification procedure is significantly simplified by using an OC-SVM, since only one template is used for user authentication. Consequently, the procedure is faster and its duration does not depend on the size of the users' database. For increased reliability of the authentication decision, at least 50 images of the user's face selected from the input video sequence (and hence 50 features vectors) may be used, which is also the size of the training set. Using all the images of the test video yield similar performance, but the authentication procedure becomes slower.

In conclusion, since only the user's class (or the target class) representations are necessary for enrollment, the present invention is significantly less resource consuming than traditional SVM-based approaches. As a consequence, it is faster and highly portable on systems with limited computational power, like embedded systems (e.g., handheld devices, cellular phones, smart phones, etc.). Moreover, the present invention is designed with a modular approach, where a number of common modules are implemented (biometric sample acquisition module, the image processing module, the enrollment or training module, the verification module). The modularity of the solution permits a high degree of distribution of the computational tasks, a fundamental feature for client/server architectures.

The invention claimed is:

1. An automatic biometric identification method based on face recognition and support vector machines, comprises:
generating a user's reference template; and
identifying the user based on the user's reference template; wherein
generating the user's reference template comprises:
acquiring a number of user's face images; and
training a support vector machine based on the user's face images;
the support vector machine being a one-class support vector machine trained based on user's face images only, wherein training the one-class support vector machine comprises:
extracting a feature vector from each user's face image; and
training the one-class support vector machine based on the extracted feature vectors, wherein
extracting the feature vector from each user's face image comprises:
computing a transform in the frequency domain of each user's face image to generate a respective spectrum; and
forming the feature vector for each user's face image based on coefficients of frequencies of the respective spectrum which comprise coefficients of low frequencies of the respective spectrum.

2. An automatic biometric identification method based on face recognition and one class support vector machines, comprises:
generating a user's reference template; and
identifying the user based on the user's reference template; wherein
generating the user's reference template comprises:
acquiring a number of user's face images; and
training a number of one-class support vector machines equal to the number of regions in the user's face images, each one-class support vector machine being trained based on the feature vectors extracted from a corresponding region in the user's face images;
the one-class support vector machines trained based on user's face images only, wherein
training the one-class support vector machines comprises:
extracting a feature vector from each user's face image; and
training the one-class support vector machines based on the extracted feature vectors and wherein
extracting the feature vector from each user's face image comprises:
dividing each user's face image into a number of regions; and
extracting the feature vector from at least some regions in the user's face image.

3. The method of claim 1 wherein extracting the feature vector from each user's face image comprises:
computing the transform in the frequency domain of each user's face image to generate the respective spectrum; and
forming the feature vector for each user's face image based on coefficients of frequencies of the respective spectrum.

4. The method of claim 3, wherein the transform is a Fourier-based transform.

5. The method of claim 4, wherein each feature vector comprises coefficients of significant frequencies of the respective spectrum.

6. The method of claim 4, wherein the transform is a Fourier-Mellin transform.

7. The method of claim 4, wherein the transform is a Fourier transform.

8. The method of claim 1, wherein each feature vector comprises the coefficients of the lowest 27 up to 30 frequencies of the spectrum.

9. The method of claim 1, wherein each feature vector comprises a coefficient of a continuous component, the real parts of the coefficients of the lowest 27 frequencies, and imaginary parts of the coefficients of the lowest 27 frequencies of the respective spectrum.

10. The method of claim 2, wherein extracting the feature vector from at least some of the regions in the user's face image comprises:
computing a number of local binary pattern histograms for each region; and
forming the feature vector for each region based on the local binary pattern histograms computed for the region.

11. The method of claim 10, further comprising: weighting the feature vectors based on the significance of the face portions in the respective regions.

12. The method of claim 1 or 2, wherein extracting the feature vector from each user's face image comprises:
forming the feature vectors with the intensity value of at least some pixels in the user's face image.

13. The method of claim 1 or 2, wherein at least one one-class support vector machine is based on a kernel function with a variance which is set substantially equal to the average Euclidean distance between the feature vectors.

14. The method of claim 1 or 2, wherein at least one one-class support vector machine operates by mapping the feature vectors into a high-dimensional feature space and by finding a hypersphere that encompasses most of the feature vectors extracted from user's face images, the hypersphere having a given center and a given radius defining a nominal acceptance threshold for user identification; further comprising;
adjusting the radius of the hypersphere on a per user basis to reduce false rejections during the user identification.

15. The method of claim 14, wherein adjusting the radius of the hypersphere comprises:
extracting feature vectors from a new training set on a per user basis;
computing the average value of the distances from the feature vectors extracted from the new user training set to the boundary of the user's hypersphere and the corresponding standard deviation; and
computing an effective acceptance threshold based on the radius of the hypersphere and the computed average distance and standard deviation.

16. The method of claim 15, wherein the average distance and the standard deviation are computed during the user enrollment phase.

17. The method of claim 14, further comprising:
adjusting the center of the hypersphere to reduce the false acceptance rate computed for the user.

18. The method of claim 1 or 2, wherein identifying the user based on the user's reference template comprises:
acquiring a number of user's face images;
extracting feature vectors from the user's face images; and
identifying the user based on extracted feature vectors, the user's reference template, and at least one one-class support vector machine trained for the user.

19. The method of claim 17, wherein identifying the user comprises:
inputting the extracted feature vectors and the user's reference template into the one-class support vector machine trained for the user, the one-class support vector machine computing the distance between each feature vector and the center of the hypersphere; and
identifying the user based on the computed distances.

20. The method of claim 18, wherein identifying the user based on the computed distances comprises:
comparing each computed distance with the threshold acceptance; and
identifying the user based on the outcomes of comparisons.

21. An automatic biometric identification system based on face recognition and support vector machines, comprising:
a module for generating a user's reference template, the module comprising a support vector machine;
a module for identifying the user based on the user's reference template; wherein
said module for generating the user's reference template comprises:
a module for acquiring a number of user's face images; and
a module for training the support vector machine based on the user's face images;
the support vector machine being a one-class support vector machine trained based on user's face images only, wherein training the one-class support vector machine comprises:
extracting a feature vector from each user's face image; and
training the one-class support vector machine based on the extracted feature vectors, wherein
extracting the feature vector from each user's face image comprises:
computing a transform in the frequency domain of each user's face image to generate a respective spectrum; and
forming the feature vector for each user's face image based on coefficients of frequencies of the respective spectrum which comprise coefficients of low frequencies of the respective spectrum.

22. A computer program tangibly embodied as instructions on a non-transitory computer-readable storage medium capable, when loaded and run in a processing system, of implementing the method according to claim 1.

23. An automatic biometric identification system based on face recognition and support vector machines, comprising:
  a module for generating a user's reference template, the module comprising a support vector machine;
  a module for identifying the user based on the user's reference template; wherein
  said module for generating the user's reference template comprises:
    a module for acquiring a number of user's face images; and
    a module for training a number of one-class support vector machines equal to the number of regions in the user's face images;
  the support vector machines being a one-class support vector machine trained based on user's face images only, wherein
  training the one-class support vector machines comprises:
    extracting a feature vector from each user's face image; and
    training the one-class support vector machines based on the extracted feature vectors and wherein
  extracting the feature vector from each user's face image comprises:
    dividing each user's face image into a number of regions; and
    extracting the feature vector from at least some regions in the user's face image.

24. A computer program tangibly embodied as instructions on a non-transitory computer-readable storage medium product capable, when loaded and run in a processing system, of implementing the method according to claim 2.

* * * * *